2,904,535
Patented Sept. 15, 1959

2,904,535

CURING POLYALKYLENEETHER POLYURETHANES WITH AROMATIC DIISOCYANATES

Thomas F. Mika, Orinda, Calif., assignor to Shell Development Company, New York, N.Y., a corporation of Delaware No Drawing. Application February 27, 1956
Serial No. 567,717

11 Claims. (Cl. 260—77.5)

This invention relates to new compositions curable to rubbery or hard resinous products as well as to the method of producing the compositions and their cure or vulcanization. More particularly, the invention pertains to compositions containing rubbery polyurethanes of polyalkylene ether glycols and diisocyanates in admixture with a special and highly advantageous class of diisocyanate curing agents.

Polyurethanes of polyoxyalklene glycols and diisocyanates are well known materials. Depending upon such factors as the kind and molecular weight of the polyoxyalkylene glycol as well as the molecular weight of the polyurethane, these polyurethanes can be cured by mixing, and if desired, heating with added diisocyanates to form rubbery to hard resinous products. A particularly valuable polyurethane is obtained from polytetramethylene ether glycol and 2,4-tolylene diisocyanate. Upon being cured with 4,4'-methylene bis-o-tolylisocyanate, after proper compounding, a valuable product is obtained. This rubbery product has several outstanding properties. It has excellent abrasion resistance and when used as tread of automobile tires, gives better wear than is obtained with cold GR-S rubber. Furthermore, it has outstanding heat and ozone resistance as compared to ordinary rubber. Although this polyurethane rubber possesses these advantageous properties, it has not been adopted in general commercial use. A principal reason for this is the undue precision required in curing or vulcanizing operations.

For example, when ordinary raw rubbers are compounded with curing or vulcanizing agents (usually sulfur), the compounded stock may be stored for lengthy times at ordinary temperature and then cured or vulcanized without loss in properties due to the time of storage. In other words, ordinary compounded rubber stocks have very long or indefinite "bin scorch" times. This characteristic is of prime importance for commercial utilization of rubbers. It is not practicable in large scale operations to cure or vulcanize compounded stocks immediately after compounding the raw rubbers with the curing agents. The compounded stocks must be capable of being stored for at least reasonable intervals before being utilized and cured.

Now when a typical polyurethane rubber such as that from polytetramethylene ether glycol and 2,4-tolylene diisocyanate is compounded or mixed with the best curing agent known heretofore, 4,4'-methylene bis-o-tolylisocyanate, the compounded stock must be cured or vulcanized shortly thereafter. Otherwise, scorching at ordinary room temperature occurs—i.e., the compounded stock increases in viscosity which indicates curing occurs even at the relatively low storage temperature. If the compounded stock is not utilized reasonably soon after compounding, the stock becomes scorched so severely that it cannot be fabricated and vulcanized into high quality articles of manufacture such as tires, hoses, belting and the like.

It is therefore a principal object of the present invention to provide a compounded polyurethane composition containing a new class of diisocyanate curing agents which overcome the deficiencies of those known heretofore. This and other objects which will become apparent are accomplished by the present invention.

I have discovered that unexpectedly outstanding properties are possessed by compositions comprising a polyurethane in admixture with a phenylene diisocyanate having hydrocarbon radicals in ortho position to each isocyanato group. Durene diisocyanate is a typical member of these curing agents. In comparison with polyurethane compositions containing the best diisocyanate curing agents known heretofore, the rubbery compositions of my invention have a number of outstanding and valuable properties including greatly improved storage stability of the compounded stock as well as a lower initial scorch time; higher tensile strength and higher elongation for the cured composition; less change in physical properties of the cured composition upon variation of the amount of the diisocyanate used in the composition—i.e., less sensitivity with respect to proportions; and optimum physical properties are reached immediately after curing whereas prior products require air aging (apparently further cross-linkage by moisture).

These desirable properties are realized by the compositions of the invention containing a phenylene diisocyanate having a hydrocarbon radial attached at each ortho position relative to the isocyanato groups. The diisocyanates include two different classes of compounds. The preferred class is a derivative of 1,4-phenylene diisocyanate wherein the four ortho carbon atoms relative to the isocyanato groups are linked to like or unlike hydrocarbon radicals which are preferably lower alkyl groups. Durene diisocyanate is a typical member of this group. The second class is a derivative of 1,3-phenylene diisocyanate wherein the three nuclear carbon atoms in ortho position are linked similarly to like or unlike hydrocarbon radicals and the 5-position may or may not be joined to a hydrocarbon radical. Isodurene diisocyanate and 1,3,5-trimethyl-2,4-diisocyanatobenzene are typical of the second class. The three or four hydrocarbon radicals linked to nuclear carbon atoms in either class of compounds can be of any variety including alkyl, alkenyl, alicyclic, aryl, alkaryl and aralkyl groups. Typical groups are such straight chain alkyl radicals as the methyl, ethyl, butyl, amyl, octyl, lauryl and stearyl radicals; such branched chain alkyl radicals as the isopropyl, secondary-, tertiary-, and isobutyl, 2-ethyl hexyl, and tetramethyloctyl radicals; alkenyl radicals such as allyl, crotyl and oleyl radicals; cycloalkyl radicals such as cyclopentyl, cyclohexyl, 2-methylcyclopentyl and 1-ethylcyclohexyl radicals; aryl and alkaryl radicals such as phenyl, 4-methylphenyl, 3-isopropylphenyl and naphthyl radicals; and aralkyl radicals such as benzyl, cinnamyl, phenylethyl and naphthylmethyl radicals. Representative specific compounds giving the advantages of the invention include durene diisocyanate, isodurene diisocyanate, 1-methyl-3,5-diethyl-4,6-phenylene diisocyanate, 1,3,5-trimethyl-2-ethyl-4,6-phenylene diisocyanate, 1,2,4-trimethyl-5-ethyl - 3,6- phenylene diisocyanate, 1,3,5-triethyl-2,4-phenylene diisocyanate, 1,3,5-triethyl-2-propyl-4,6-phenylene diisocyanate, 1,2,4-trimethyl-5-isopropyl-3,6 - phenylene diisocyanate, 1,3,5-trimethyl-2-isobutyl-4,6-phenylene diisocyanate, 1,2,4,5-tetraethyl-3,6-phenylene diisocyanate or 1,4-diisocyanato-2,3,5,6-tetraethylbenzene, 1,3,5-triisopropyl-2,4 - phenylene diisocyanate, 1,3,5-trimethyl-2-heptyl-4,6-phenylene diisocyanate, 1,3,5-trimethyl - 2 cetyl-4,6 - phenylene diisocyanate, 1,3,5 - trimethyl-2-propenyl-4,6-phenylene diisocyanate, 1,2,4-trimethyl-5-cyclohexyl-3,6 - phenylene diisocyanate, 1,2,4,5 - tetraphenyl-3,6-phenylene diisocyanate, 1,2,3,5-tetracyclohexyl-4,6-phenylene diisocyanate, and 1,3,5-tricyclopentyl-2,4-phenylene diisocyanate. The diisocyanate curing agents are obtainable by application of known procedures to appropriate starting materials. The aromatic primary diamines may be first prepared by nitrating the appropriate hydrocarbon-substituted benzene and then reducing the nitro groups to amino groups in known manner, or the corresponding aromatic chlorides or bromides are reacted as customary with ammonia. The aromatic primary diamine or its hydrochloride salt is then reacted with phosgene whereby the desired diisocyanate is obtained. U.S. Patents 2,680,127–130, for example, describe in detail suitable methods for carrying out this reaction which are equally suitable for preparing the diisocyanate curing agents of this invention. The preparation of these curing agents, including durene diisocyanate, is described in particular in copending application Serial No. 456,078, filed September 14, 1954, and assigned to the same assignee as the present application.

As mentioned above, the hydrocarbon radicals linked in ortho position to both the 1,4- and 1,3-diisocyanatobenzenes are preferably alkyl groups, particularly like or unlike alkyl radicals of 1 to 4 carbon atoms.

The polyurethanes with which are mixed the diisocyanate curing agents are a well known class of thermoplastic polymeric substances. Very suitable polyurethanes of a polytetramethylene ether glycol and a diisocyanate are obtained by reacting the glycol with an aromatic diisocyanate. See, for example, U.S. Patent 2,702,797 and the references referred to therein. More generally, the polymeric constituents of the compositions are polyurethanes of polyoxyalkylene glycols and a diisocyanate which may be either aromatic or aliphatic. Various polyoxyalkylene glycols are used for this purpose such as polyethylene glycol, polypropylene glycol, polytrimethylene glycol, polybutylene glycol, mixed polyethylene-propylene glycol and the like. Similarly, various diisocyanates are employed such as 1,3- and 1,4-phenylene diisocyanate, 4,4'-biphenyl diisocyanate, 1,5-naphthylene diisocyanate, diphenylmethane-4,4'-diisocyanate, and tetra-, penta-, hexa- and octamethylene diisocyanate. Such polyurethanes are described, for example, in U.S. Patents 2,511,544, 2,692,873, 2,692,874 and 2,702,797. If desired, the thermoplastic polyurethanes may be prepared from the same or different diisocyanates employed as curing agents in the composition of this invention. As described in above-noted U.S. Patent No. 2,511,544, the polyurethane is a linear polymer comprising essentially structural units of the formula

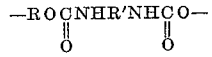

in which R and R' are respectively divalent residues of organic diols and organic diisocyanates which, except for their hydroxy and isocyanate radicals, are free of functional groups. In the case of the polyurethane of a polyalkylene glycol, R represents the divalent organic radical that remains after removal of both terminal hydroxyl groups from the glycol. The preferred polyurethane is derived from polytetramethylene glycol and in this linear polymer R in the structural units represents the divalent radical in polytetramethylene glycol to which the hydroxyl groups are attached. Such a polyurethane is described in above-noted U.S. Patent Nos. 2,692,873, 2,692,874 and 2,702,797.

The polyurethanes of the polyoxyalkylene glycols are preferably derived from polymeric glycols having molecular weights of about 500 to 10,000 although glycols of lower or higher molecular weights are also suitable. The molecular weights of the polyurethanes are considerably higher such as from about 10,000 to 50,000 or higher.

The compositions of the invention are prepared by mixing the diisocyanate curing agent with the polyurethane. This is conveniently effected on a roll mill which may be heated at about 25 to 150° C. In general, it is desirable to effect the mixing at as low a temperature as is consistent with homogeneous incorporation of the diisocyanate curing agent so as to avoid appreciable curing of the polymer during the mixing. Since the polyurethanes at times contain some water which is undesirable, it is of value to first mill the polyurethane alone at about 80 to 120° C. or higher for a short time such as 5 to 30 minutes to remove water therein as well as produce tack, etc.

The amount of diisocyanate curing agent incorporated in the compositions varies widely. Although a particular proportion assists in obtaining optimum properties for the cured compositions, it is a characteristic of the present compositions that good properties are achieved even though there is much variation in the proportion of curing agent. However, like prior diisocyanate curing agents, the best proportion is dependent upon the number of active hydrogen atoms contained in the particular polyurethane which in turn varies with the glycol, its molecular weight, the isocyanate employed in its formation along with auxiliary substances and the like. An effective amount of the diisocyanate curing agent is generally employed, from about 0.5 to 25% (weight) usually being the range while amounts of from about 1 to 10% are often most desirable.

There may also be incorporated in the compositions of the invention the usual fillers (carbon black, magnesium, silica, iron oxide, zinc oxide, etc.), plasticizers, softeners, extenders, resins, other diisocyanates, stabilizers and the like.

The compositions of the invention are cured or vulcanized to useful articles of manufacture by placing in a form or mold and heat curing. The usual forms or molds are used for this purpose including extruding machines. The cure of the composition is ordinarily effected by heating at about 100 to 200° C. for about 30 to 120 minutes although different temperatures and times may also be employed. Although application of pressure is not essential to effect cure, it is often advantageous in shaping during the curing or vulcanizing. Thus in curing compositions to rubbery products, the usual hydraulic rubber presses are quite satisfactory for use.

The following examples are given for the purpose of illustrating the invention. The parts are by weight.

*Example 1*

Gum stocks were prepared by milling Adiprene B on a roll mill at about 100° C. for 10 minutes, and then during about a minute's milling time, incorporating 3.0 parts of durene diisocyanate or 3.0 parts of 4,4'-methylene bis-o-tolylisocyanate per hundred parts of the polyurethane. Adiprene B is a rubbery polyurethane from about 80% polytetramethylene ether glycol (molecular weight in the range of about 1000 to 3000) and 20% tolylene-2,4-diisocyanate having a molecular weight in the range of 20,000–30,000 as measured by light scattering and is obtainable from E. I. du Pont de Nemours & Co., Inc.

The Mooney scorch time of the gum stocks was then determined, the tests being made both at 1 hour and 14 days after compounding. The gum stocks aged for 14 days were kept wrapped in polyethylene bags at about 70° F. The results are tabulated below.

| Curing agent | Aging time | Mooney scorch time; minutes at 121° C. for 15 ML rise in viscosity |
|---|---|---|
| Durene diisocyanate | 1 hour | 58 |
| 4,4'-methylene bis-o-tolylisocyanate | do | 21 |
| Durene diisocyanate | 14 days | 44 |
| 4,4'-methylene bis-o-tolylisocyanate | do | 4 |

The foregoing results demonstrate that while the compositions containing the durene diisocyanate undergo relatively small cure on being stored for 14 days, the corresponding compositions have suffered almost complete incipient cure during the same period.

*Example 2*

Gum stocks were prepared by milling 100 parts of Adiprene B with 2.0 parts of durene diisocyanate and with 3.0 parts of 4,4'-methylene bis-o-tolylisocyanate. These amounts of the two curing agents give nearly identical molecular proportions of isocyano groups. The gum stocks were cured at 134° C. for 60 minutes and the tensile strength in pounds per square inch was determined both for the initial gum stocks and samples which had been stored in a bin for 14 days at about 70° F. The results were as follows:

| Curing agent | Tensile strength | |
|---|---|---|
| | Initial | 14 days' bin storage |
| Durene diisocyanate | 4,150 | 3,950 |
| 4,4'-methylene bis-o-tolylisocyanate | 2,550 | 1,875 |

While substantially the same tensile strength of the cured product from the gum stock containing the durene diisocyanate was obtained after 14 days' bin storage, the product from the other gum stock suffered marked decrease in strength.

*Example 3*

Comparative compositions as given below were similarly prepared on a roll mill at 100° C. Some contained Micronex W-6, an EPC black from Binney & Smith, Co., and a plasticizer which was a liquid butadiene-acrylonitrile copolymer, Hycar 1312, from B. F. Goodrich Chemical Co. Hylene DMM is 4,4'-methylene bis-o-tolylisocyanate, a product of Du Pont. Samples of the compositions were cured in a hydraulic press for 60 minutes at 140° C. under a pressure of 400 pounds per square inch. Standard physical properties of the vulcanizates were determined after aging for 1 day at about 70° F. and 55% relative humidity, after aging for 14 days at about 70° F. and 55% relative humidity, and after accelerated aging for 21 days at about 80° C.

| | | | | | | |
|---|---|---|---|---|---|---|
| Adiprene B | 100 | 100 | 100 | 100 | 100 | 100 |
| Hylene DMM | 3 | 3 | | | | |
| Durene diisocyanate | | | 2 | 3 | 3 | |
| 3,6-diisocyanato-5-Ethyl pseudocumene | | | | | | 3 |
| Micronex W-6 | | 2.5 | | | 2.5 | |
| Plasticizer | | 2.5 | | | 2.5 | |
| After 1 day aging: | | | | | | |
| Tensile strength, p.s.i. | 2,700 | 3,450 | 4,100 | 3,900 | 4,200 | 3,600 |
| Ultimate elongation, percent | 580 | 625 | 580 | 565 | 560 | 500 |
| Modulus at 300% elong. | 480 | 520 | 600 | 750 | 800 | 760 |
| Permanent set, percent | 7 | 10 | 7 | 7 | 8 | 7 |
| Hardness, Shore A | 60 | 56 | 59 | 62 | 63 | 60 |
| After 14 days' aging: | | | | | | |
| Tensile strength, p.s.i. | 3,500 | 4,000 | 4,500 | 4,600 | 4,600 | 4,200 |
| Ultimate elongation, percent | 500 | 580 | 550 | 600 | 540 | 515 |
| Modulus at 300% elong. | 670 | 640 | 740 | 600 | 900 | 985 |
| Permanent set, percent | 5 | 5 | 5 | 6 | 7 | 8 |
| Hardness, Shore A | 60 | 56 | 59 | 62 | 61 | 60 |
| After 21 days at 80° C.: | | | | | | |
| Tensile strength, p.s.i. | 3,010 | 3,500 | 4,000 | 4,700 | 4,700 | 4,000 |
| Ultimate elongation, percent | 590 | 610 | 580 | 625 | 545 | 560 |
| Modulus at 300% elong. | 575 | 650 | 690 | 650 | 940 | 770 |
| Permanent set, percent | 6 | 6 | 6 | 6 | 6 | 6 |
| Hardness, Shore A | 56 | 56 | 59 | 64 | 62 | 60 |

*Example 4*

In order to demonstrate that the compositions of the invention were less sensitive to variation in proportion of the curing agent than those known heretofore, several compositions were prepared containing Adiprene B and varying amounts of durene diisocyanate or Hylene DMM by milling the polyurethane for about 10 minutes at 100° C. and then incorporating the curing agent. The resulting gum stocks were cured in a hydraulic press for 30, 40 and 60 minutes at 140° C. under 400 pounds per square inch. The tensile strength of the vulcanizates were then determined and the results given in the tabulation below were obtained.

| Curing agent | Parts per 100 Adiprene B | Tensile strength, p.s.i., after cure at 140° C. for— | | |
|---|---|---|---|---|
| | | 30 min. | 45 min. | 60 min. |
| Durene diisocyanate | 2.0 | 2,750 | 3,750 | 4,150 |
| Do | 4.0 | 2,900 | 3,550 | 2,850 |
| Do | 6.0 | 3,250 | 3,600 | 3,950 |
| Hylene DMM | 1.5 | 3,100 | 3,400 | 2,800 |
| Do | 3.0 | 2,000 | 2,500 | 2,550 |
| Do | 5.0 | 2,600 | 3,300 | 3,450 |

I claim as my invention:

1. A composition comprising a thermoplastic polyurethane having a molecular weight of at least about 10,000 which has had admixed therewith from 0.5 to 25% by weight of a phenylene diisocyanate having a hydrocarbon radical selected from the group consisting of alkyl, cyclohexyl and phenyl radicals attached at each ortho position relative to the isocyanato groups, said polyurethane being a linear polymer comprising essentially structural units of the formula $$-\text{R O C N H R' N H C O}-$$
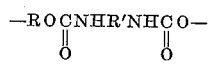

in which R is the divalent radical obtained by removing the terminal OH groups from a polyalkylene ether glycol having a molecular weight of at least 500, and R' is the divalent radical obtained by removing the terminal isocyanate groups from an organic diisocyanate.

2. A composition comprising a rubbery thermoplastic polyurethane of polytetramethylene ether glycol having a molecular weight of at least 500 and tolylene-2,4-diisocyanate having a molecular weight in the range of about 10,000 to 40,000 which has had admixed therewith about 1 to 10% by weight of a tetra-alkyl-1,4-diisocyanato-benzene as curing agent.

3. A composition comprising a rubbery thermoplastic polyurethane of a polytetramethylene ether glycol having a molecular weight of at least 500 and tolylene-2,4-diisocyanate said polyurethane having a molecular weight of about 10,000 to 40,000 in admixture with about 1 to 10% by weight of durene diisocyanate.

4. A composition comprising a rubbery thermoplastic polyurethane of a polytetramethylene ether glycol having a molecular weight of at least 500 and tolylene-2,4-diisocyanate said polyurethane having a molecular weight of about 10,000 to 40,000 in admixture with about 1 to 10% by weight of 1,4-diisocyanato-2-ethyl-3,5,6-trimethylbenzene.

5. A process which comprises incorporating from 0.5 to 25% by weight of a phenylene diisocyanate having a hydrocarbon radical selected from the group consisting of alkyl, cyclohexyl and phenyl radicals attached at each ortho position relative to the isocyanato groups with a thermoplastic polyurethane having a molecular weight of at least about 10,000 that is a linear polymer comprising essentially structural units of the formula $$-\text{R O C N H R' N H C O}-$$
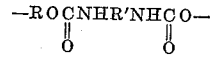

in which R is the divalent radical obtained by removing the terminal OH groups from a polyalkylene ether glycol having a molecular weight of at least 500 and R' is the divalent radical obtained by removing the terminal isocyanate groups from an organic diisocyanate, and heating the resulting composition at 100° C. to 200° C.

6. A process which comprises mixing about 1 to 10% by weight of durene diisocyanate with a thermoplastic rubbery polyurethane having a molecular weight of at least about 10,000 and being the reaction product of polytetramethylene ether glycol having a molecular weight of at least 500 and tolylene-2,4-diisocyanate, and heating the resulting mixture at 100° C. to 200° C.

7. A process which comprises mixing about 1 to 10% by weight of 3,6-diisocyanato-5-ethyl pseudocumene with a thermoplastic rubbery polyurethane having a molecular weight of at least about 10,000 and being the reaction product of polytetramethylene ether glycol having a molecular weight of at least 500 and tolylene-2,4-diisocyanate, and heating the resulting mixture at 100° C. to 200° C.

8. A process which comprises mixing about 1 to 10% by weight of durene diisocyanate with a thermoplastic rubbery polyurethane having a molecular weight of at least about 10,000 and being the reaction product of polytetramethylene ether glycol having a molecular weight of at least 500 and tolylene-2,4-diisocyanate and subsequently vulcanizing the composition by application of heat at about 100 to 200° C.

9. A process which comprises mixing about 1 to 10% by weight of 3,6-diisocyanato-5-ethyl pseudocumene with a thermoplastic rubbery polyurethane having a molecular weight of at least about 10,000 and being the reaction product of polytetramethylene ether glycol having a molecular weight of at least 500 and tolylene-2,4-diisocyanate and subsequently vulcanizing the composition by application of heat at about 100 to 200° C.

10. A composition as in claim 1 wherein the phenylene diisocyanate which is admixed with the said thermoplastic polyurethane is durene diisocyanate.

11. A composition as in claim 1 wherein the phenylene diisocyanate which is admixed with the said thermoplastic polyurethane is 1,4-diisocyanato-2-ethyl-3,5,6-trimethyl benzene.

References Cited in the file of this patent

FOREIGN PATENTS 501,126    Canada _____ Mar. 30, 1950